US008526303B2

(12) United States Patent
Rodgers et al.

(10) Patent No.: US 8,526,303 B2
(45) Date of Patent: Sep. 3, 2013

(54) FLOW CONTROL MECHANISM IN A DATA PROCESSING PIPELINE

(75) Inventors: Steve Walter Rodgers, San Diego, CA (US); Rajesh Mamidwar, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1794 days.

(21) Appl. No.: 11/344,329

(22) Filed: Jan. 31, 2006

(65) Prior Publication Data

US 2007/0177581 A1 Aug. 2, 2007

(51) Int. Cl.
| H04J 1/16 | (2006.01) |
| H04J 3/14 | (2006.01) |
| G06F 3/00 | (2006.01) |
| G06F 5/00 | (2006.01) |
| H04N 7/173 | (2011.01) |

(52) U.S. Cl.
USPC ............. 370/229; 370/235; 710/52; 710/53; 710/54; 710/55; 710/56

(58) Field of Classification Search
USPC ............. 725/94, 98, 107; 370/358; 710/52, 710/53, 57, 58
See application file for complete search history.

(56) References Cited

U.S. PATENT DOCUMENTS

| 6,192,466 B1 * | 2/2001 | Gschwind ..................... 712/214 |
| 6,446,029 B1 * | 9/2002 | Davidson et al. ............. 702/186 |
| 6,512,757 B1 * | 1/2003 | Niegel et al. .................. 370/342 |
| 6,907,534 B2 * | 6/2005 | Ku ................................. 713/320 |
| 7,372,814 B1 * | 5/2008 | Chiruvolu et al. ............ 370/235 |
| 2002/0120831 A1 * | 8/2002 | Wong et al. .................... 712/219 |
| 2003/0115428 A1 * | 6/2003 | Zaccarin et al. .............. 711/156 |
| 2003/0163589 A1 * | 8/2003 | Bunce et al. .................. 709/250 |
| 2003/0169261 A1 * | 9/2003 | Emberling et al. ........... 345/506 |
| 2004/0088520 A1 * | 5/2004 | Gupta et al. ....................... 712/1 |
| 2004/0228414 A1 * | 11/2004 | Keck et al. ................ 375/240.28 |
| 2005/0138243 A1 * | 6/2005 | Tierney et al. .................. 710/52 |
| 2005/0223262 A1 * | 10/2005 | Chen et al. ..................... 713/600 |
| 2005/0232462 A1 * | 10/2005 | Vallone et al. ................ 382/103 |
| 2005/0259960 A1 * | 11/2005 | Wan et al. ........................ 386/83 |

* cited by examiner

Primary Examiner — Nasser Goodarzi
Assistant Examiner — Kyu Chae
(74) Attorney, Agent, or Firm — Thomas | Horstemeyer, LLP

(57) ABSTRACT

Herein described are at least a system and a method for regulating data flow in a data pipeline that may be used in a video processing system. The system comprises a processor, one or more data buffers, and one or more processing stations. The one or more data buffers may be used to buffer corresponding processing stations. Each of the one or more processing stations may comprise a switching circuitry that is used to inhibit data transmission when a hold signal is received from the processor. The processor may send the signal in response to a feedback control signal generated by the one or more processing stations. The method may comprise determining if the processing time of a processing station exceeds a specified time. The method further comprises generating a feedback control signal to a processor if the specified time is exceeded.

24 Claims, 4 Drawing Sheets

FLOW CONTROL MECHANISM IN A DATA PROCESSING PIPELINE

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

When a device such as a personal video recorder (PVR) processes multimedia data it receives from a telecommunications carrier, the multimedia data must be processed at a particular data rate. One or more packets may be processed by the PVR for one or more reasons. For example, the one or more packets may be processed when generating an index table for the PVR, in which the index table may be used to quickly index a program stored in a hard disk drive of the PVR. Unfortunately, when one or more packets require long processing times, packet processing may be affected, resulting in congestion within the data pipeline. This may have a significant effect on data flow through the data pipeline. Similarly, a digital video recorder (DVR) or a set-top box may exhibit this type of congestion when it processes one or more packets. The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide at least a system and a method for regulating the flow of data along a data pipeline of a video processing system. The various aspects of the invention are substantially shown in and/or described in connection with at least one of the following figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Various aspects of the invention provide at least a system and method of optimizing the throughput and flow control of data that is received and processed by a video processing system. The data may comprise one or more data packets provided by a telecommunications provider, for example. Depending on the type of data packet, each of the one or more data packets undergoes a certain amount of processing by the video processing system. According to the various aspects of the invention, the processing of data through the video processing system occurs by way of a data processing pipeline. The processing may occur at one or more processing points or "processing stations" along the data processing pipeline. Depending on a processing station's requirements, the processing rate or throughput may vary or change along the data processing pipeline. As a result of using the various aspects of the invention, a higher average processing rate may be attained. The various aspects of the invention maximizes data flow rate by way of executing a software and/or firmware. The software and/or firmware may be used to monitor processing conditions at the various processing points or processing stations along the data processing pipeline. When a processing "bottleneck" or overflow condition occurs at a processing station in the pipeline, processing may be postponed at one or more affected data processing stations until the condition subsides. A bottleneck or overflow condition may occur when a processing station processes a data packet significantly longer than the average processing time of the one or more upstream processing stations, for example. In accordance with the various aspects of the invention, after a bottleneck condition subsides, processing at the one or more processing stations may be resumed at the point where processing was temporarily postponed. The various aspects of the invention prevent the negative effects of downstream processing bottlenecks from affecting the upstream data processing centers, such that the overall bit rate may be maintained. The various aspects of the present invention may be utilized in any video processing system. The video processing system may comprise hardware and/or software within a digital video recorder (DVR), personal video recorder (PVR), or set-top box, for example. The set-top box may be used to process and decode digital multimedia broadcasts provided by a telecommunication operator, for example. The various aspects of the invention may be implemented using one or more integrated circuit chips within the DVR, PVR, or set-top box, for example. The video processing performed at one or more processing stations may comprise generating one or more index tables used for efficient indexing of one or more sections or portions of a multimedia program, for example. The index tables may be extracted from the one or more data packets received by the video processing system.

Figure 1:
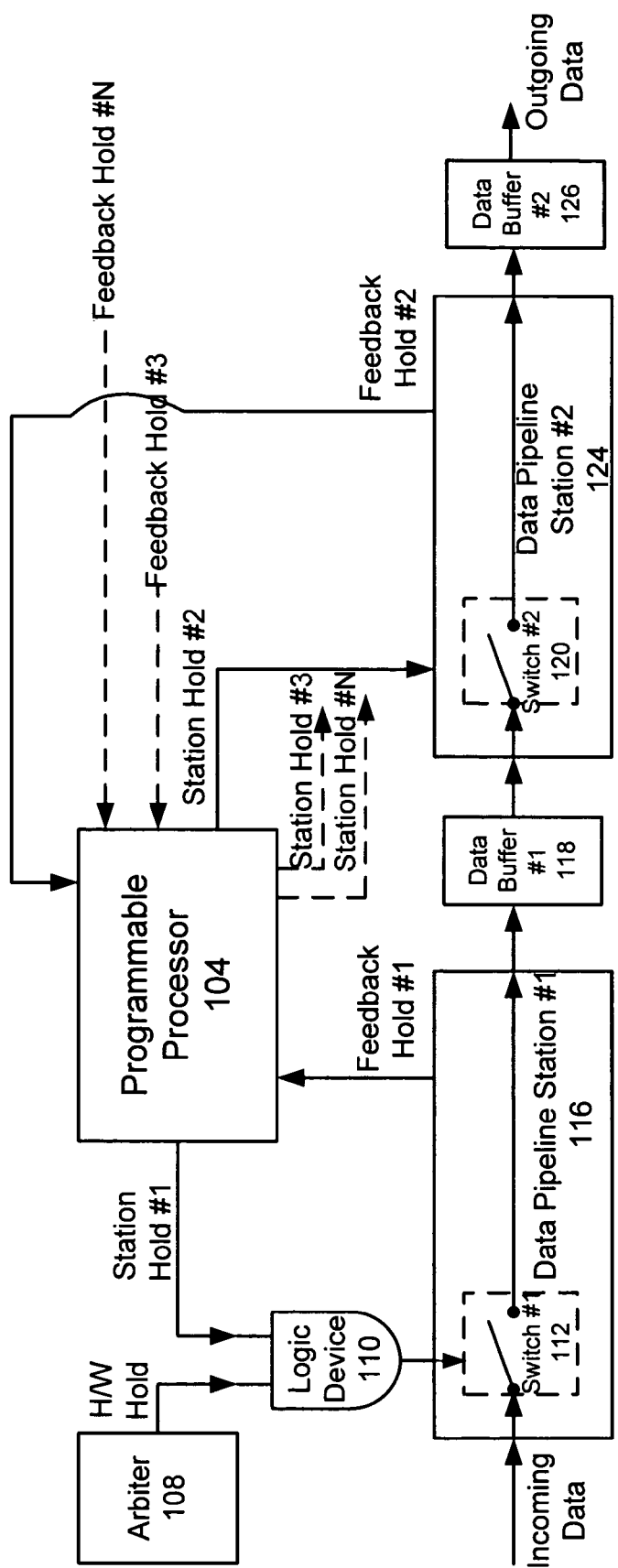
FIG. 1 is a functional block diagram of a data flow control system in accordance with an embodiment of the invention.

FIG. 1 is a functional block diagram of a data flow control system in accordance with an embodiment of the invention. The data flow control system may be used in any video processing environment or system. In a representative embodiment, the video processing system may be used in a transport de-multiplexer found in a digital video recorder (DVR) or personal video recorder (PVR) or set-top box. The transport de-multiplexer may be involved in the recording of received data into a hard disk drive, and/or the transport of multimedia data to downstream audio and video decoders, for example. The transport de-multiplexer may perform one or more processing operations along the video processing data pipeline. The operations may be performed at one or more processing points or processing stations along a data pipeline.

In accordance with an embodiment of the invention, a data flow control system of the present invention comprises a programmable processor 104 and one or more data pipeline stations 116, 124. In a representative embodiment, the data flow control system comprises a programmable processor 104, an arbiter 108, a logic device 110, a first data pipeline station 116, a second data pipeline station 124, a first data buffer 118, and a second data buffer 126. The first data pipeline station 116 comprises a first switching circuitry 112 while the second data pipeline station 124 comprises a second switching circuitry 120. The first switching circuitry 112 and the second switching circuitry 120 may be used to regulate the transmission of data into the first data pipeline station 116 and the second data pipeline station 124, respectively. The first switching circuitry 112 and the second switching circuitry 120 may comprise any circuitry capable of controlling transmission of data flow through the first data pipeline station 116 and the second data pipeline station, respectively. When data transmission is prevented by the first switching circuitry 112, for example, any data that is held up may be stored in a data buffer that immediately precedes the first switching circuitry 112. Likewise, when data transmission is halted by the second switching circuitry 120, any data that is held up may be stored in the data buffer 118 that in the illustrative embodiment of FIG. 1 immediately precedes the second switching circuitry 120. With reference to the illustrative embodiment of FIG. 1, the exemplary first and second data pipeline stations 116, 124 may comprise only two of many data pipeline stations present in a data pipeline. The video processing system may be found in a personal digital recorder (PVR) or digital video recorder (DVR), for example. Although not shown in FIG. 1, there may be more than 2 data pipeline stations (i.e., N data pipeline stations) in the video processing system. Each of the N data pipeline stations may perform various processing of the data packets it receives. As shown in the illustrative embodiment of FIG. 1, a data buffer is used to separate two adjacent data pipeline stations in the video processing data pipeline. Each of the N data pipeline stations may comprise any type of hardware and/or software used for processing data packets. The processing time at each of the N data pipeline stations may vary depending on the amount and type of processing required. Each of the N data pipeline stations may generate a feedback control signal that is transmitted back to the programmable processor 104. The one or more feedback hold signals may be used to regulate the transmission of data in the video processing system data pipeline, based on buffer levels of one or more data pipeline stations. The one or more feedback hold signals may be used as inputs to the programmable processor 104. A software and/or firmware may be executed by the programmable processor 104. The software and/or firmware may be stored within the programmable processor 104. The programmable processor 104 may comprise a memory that is used to store the software and/or firmware. In response to receiving the one or more feedback hold signals, Feedback Hold #1, Feedback Hold #2, Feedback Hold #3, . . . , Feedback Hold #N, the programmable processor 104 may generate one or more station hold signals to one or more of the N data pipeline stations. The one or more station hold signals (i.e., the Station Hold #1, . . . , #N signals) may be used to control or regulate one or more corresponding switching circuitries, such as the previously mentioned first and second switching circuitries 112, 120. In this fashion, data transmission is managed at various points along the data pipeline. In a representative embodiment, a station hold signal (e.g., station hold #1) and one or more additional signals may be input into the logic device 110. In a representative embodiment, the logic device 110 may comprise a multiple input AND gate. In a representative embodiment, as shown in connection with FIG. 1, the logic device 110 uses an input provided by the arbiter 108 and a station hold #1 input provided by the programmable processor 104. The input provided by the arbiter 108 comprises a hardware generated hold signal while the input provided by the programmable processor 104 may comprise a software/firmware generated hold signal. As shown, the arbiter 108 may generate a hold signal to the logic device 110. In a representative embodiment, the arbiter 108 may generate the hold signal when the available capacity of the first data buffer 118 reaches a certain threshold level. The first data buffer 118 buffers data transmission between the first data pipeline station 116 and the second data pipeline station 124. Likewise, the second data buffer 126 may buffer data flow between the second data pipeline station 124 and the third data pipeline station (not illustrated in FIG. 1). Similarly, the Nth data buffer may buffer data flow between the Nth data pipeline station and the (N+1)st data pipeline station. As may be seen in connection with the illustrative embodiment of FIG. 1, the station hold #1 signal and station hold #2 signal selectively control the operation of the switching circuitries 112, 120, respectively. The switching circuitries 112, 120 are controlled by the station hold signals and may be used to facilitate transmission of one or more channels or programs through the data pipeline. For example, the station hold signals may effectuate flow or transmission of only one or more specific frequency bands in the incoming data. Each of the switching circuitries 112, 120 may be used to selectively "switch" between one or more bands of signals. The programmable processor 104 may transmit one or more control signals, data signals, and address signals to the one or more data pipeline stations 116, 124 using any type of conductive path.

Figure 2:
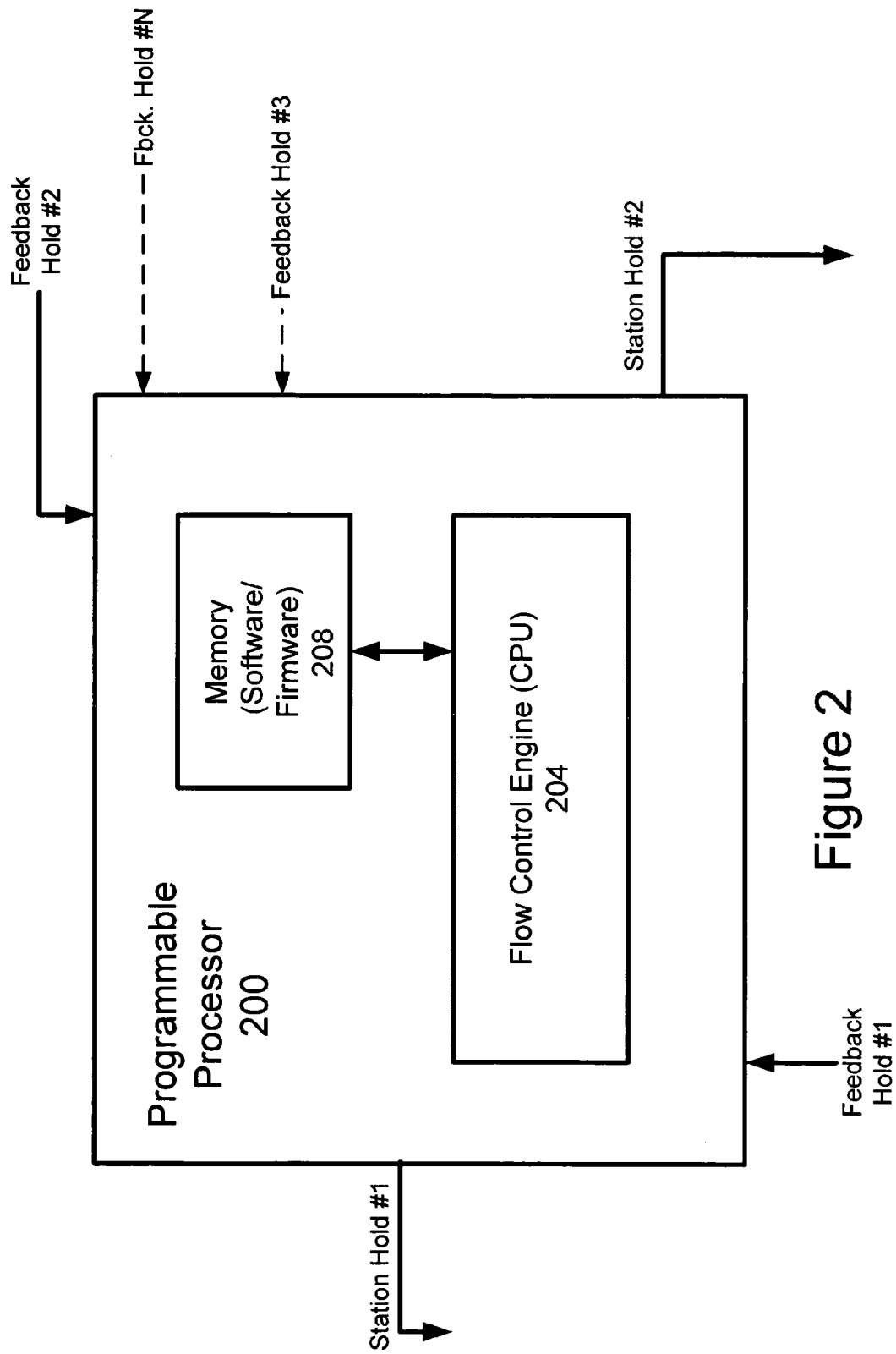
FIG. 2 is a functional block diagram of a programmable processor used in the data flow control system described in connection with FIG. 1, in accordance with an embodiment of the invention.

FIG. 2 is a functional block diagram of a programmable processor 200 used in the data flow control system described in connection with FIG. 1, in accordance with an embodiment of the invention. The programmable processor 200 comprises a flow control engine 204 and a memory 208. The memory 208 may be used to store a software/firmware. When the software/firmware is executed by the flow control engine 204, the programmable processor 200 may generate one or more station hold signals by processing one or more feedback hold signals. The flow control engine 204 may comprise a central processing unit (CPU) and/or digital logic circuitry. The flow control engine 204 communicates to the memory by way of a conductive path such as a data/address bus, for example. A pattern of station hold signals (i.e., station hold #1, station hold #1, . . . , station hold #N) is generated by the programmable processor 200 and is transmitted to the one or more switching circuitries (i.e., switching circuitry #1 112, switching circuitry #2 120, etc.) in the one or more data pipeline stations (data pipeline station #1 116, data pipeline station #2 124, . . . , data pipeline station #N). By way of control provided by the software/firmware, the one or more switching circuitries may be used to regulate the flow of data packets from one station to another along the data pipeline, such that flow congestion is minimized and processing may occur in an efficient fashion. The various aspects of the invention maximize data throughput by monitoring/regulating the processing that occurs over each of the one or more data pipeline stations 116, 124. When, for example, a PVR records program data onto a hard disk drive, various index table entries may be extracted from the received data. The index table entries may be stored into an index table buffer (ITB) for future use by a DVR or PVR or set-top box. The index table buffer may be used to efficiently index sections and/or portions of one or more programs that are recorded onto the hard disk drive. The per packet processing time during processing of index table entries, may be directly related to one or more data statistics associated with a data packet. The per packet processing time may vary widely from one data packet to another data packet. For example, packets comprising many embedded start code patterns, or packets comprising timestamp information may take longer for a software/firmware to process compared with packets without this type of information. In addition to ITB processing time, a number of other asynchronous events may also affect the time it takes to output or process a packet at each data pipeline station. The data processing queue at each data pipeline station may be managed by the software/firmware. As a result, data throughput in the pipeline is maximized such that throughput requirements may be met. Various processing requirements of each data pipeline station are prioritized by the software/firmware. The data movement through the data pipeline may also be managed in such a way that data is transferred smoothly between data pipeline stations, with minimal disruptions. A number of asynchronous processes may affect data flow in the PVR or DVR or set-top box. These asynchronous processes may require a particular data rate at a certain period of time. The processes may be affected by the data processing demands of a video decoder, audio decoder, encryptor, software/firmware, one or more data memories, or data arbitrator, for example. In accordance with the various aspects of the invention, the software/firmware controls data packet flow on a packet-by-packet basis. In a representative embodiment, every packet must receive approval from the programmable processor's software/firmware before it is allowed to be transmitted to a subsequent data pipeline station; likewise, every packet must receive approval from the programmable processor's software/firmware before a new packet is received by the data pipeline station.

The programmable processor 200 may continually monitor data buffer levels of the downstream processing data pipeline stations. The programmable processor 200 may utilize a hysteresis mechanism to determine when to assert or release a station hold. For example, the programmable processor 200 may employ a configurable high and low level setting when utilizing the hysteresis mechanism. When a downstream data pipeline station reduces the speed by which it processes data it receives, the buffer will eventually fill up and pass the high hysteresis level setting. At this point, for example, the software/firmware may issue a station hold signal to an upstream data buffer. In a representative embodiment, the station hold signal effectuates a temporary hold on the further transmission of an associated frequency band (and only that frequency band). As a result, other frequency bands will not be affected. Hence, for multiple decode systems, any effect on the read rate of a particular video/audio decoder pair will not have an effect on the read rates of other unrelated video/audio decoder pairs.

The data flow control system may be configured to support a certain minimum data rate or a certain average data rate. Any configuration changes may be implemented, for example, by modifying one or more variables used in the software/firmware. The one or more variables may be configured by a manufacturer of the device that uses the data flow control system. The device may comprise a PVR or DVR, for example.

Figure 3:
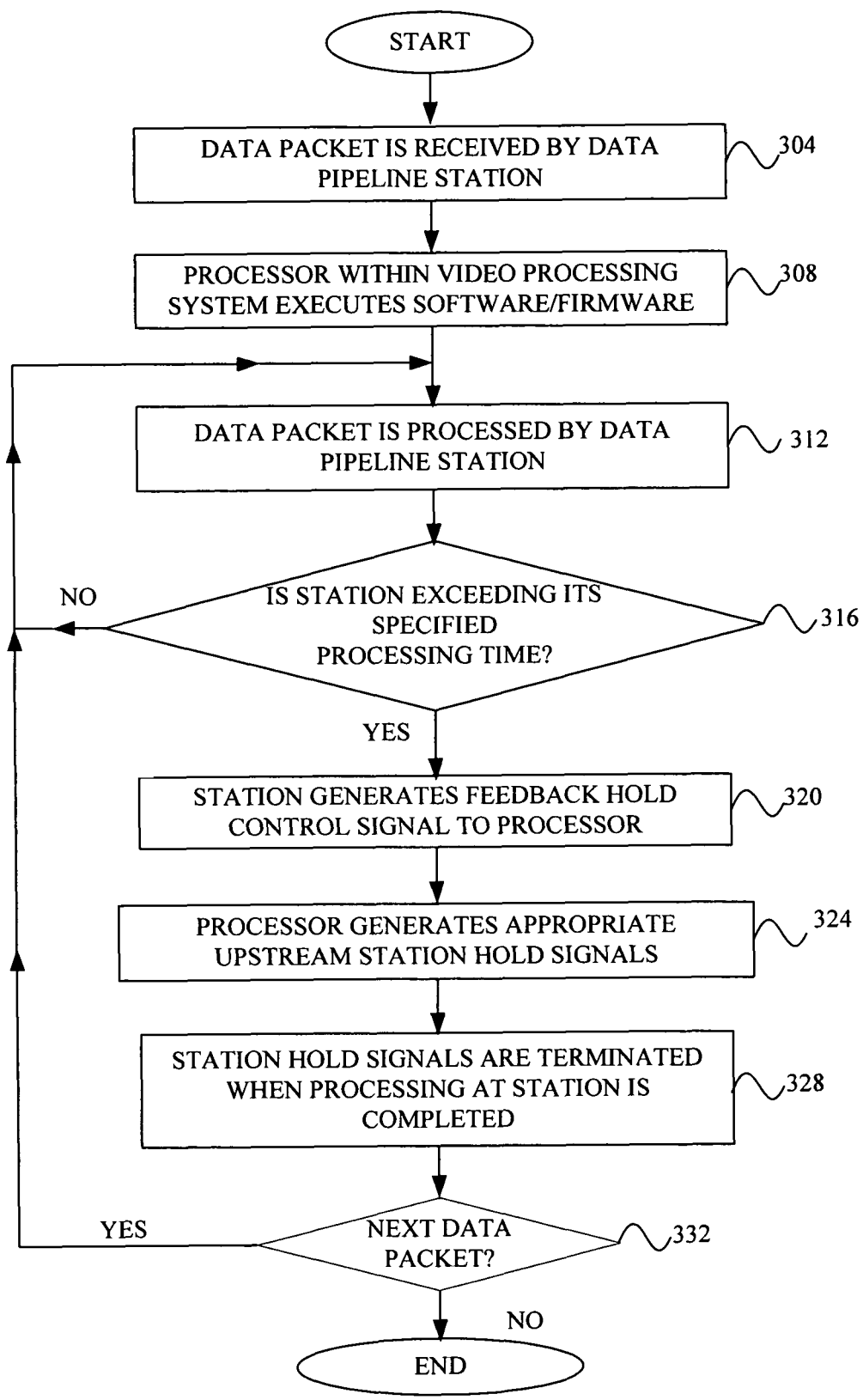
FIG. 3 is a first operational flow diagram illustrating an operation of a data flow control system in accordance with an embodiment of the invention.

FIG. 3 is a first operational flow diagram illustrating an operation of a data flow control system in accordance with an embodiment of the invention. The flow control system may be used to efficiently process data in a personal video recorder (PVR) or digital video recorder (DVR), for example. At step 304, a data pipeline station receives a data packet. Next, at step 308, a programmable processor of the data flow control system executes a software/firmware. Next, at step 312, the data packet is processed by the data pipeline station. At step 316, the programmable processor and/or data pipeline station determine if the data pipeline station is exceeding a specified processing time. In a representative embodiment, the processing performed by the data pipeline station may involve the processing of index table buffer (ITB) entries obtained from the data packet. The programmable processor may monitor the one or more data pipeline stations of the data flow control system. The maximum allowable processing time at the data pipeline station may be specified by a high-level hysteresis setting, for example. A PVR manufacturer may configure the high-level setting, during fabrication of the PVR, for example. If the data pipeline station is exceeding its allowable processing time, the process continues at step 320. At step 320, the data pipeline station generates a feedback hold signal to the programmable processor. Otherwise, the process reverts back to step 312. Thereafter, at step 324, in response to the feedback hold signal, the programmable processor generates one or more appropriate upstream station hold signals. The one or more station hold signals control and regulate transmission of upstream data packets into the data pipeline station by inhibiting transmission of additional data packets from one or more upstream data pipeline stations. This may be accomplished by disabling or inactivating the transmission of data using one or more switching circuitries, as was previously discussed in connection with FIG. 1. The one or more switching circuitries may utilize the preceding data buffer to store any data that may be held up. At step 328, after processing is completed at the data pipeline station, the one or more station hold signals are terminated such that data transmission from upstream data pipeline stations may resume. Thereafter, at step 332, an assessment is made whether another data packet is available for processing at the data pipeline station. If another packet is waiting to be processed, then the process reverts to step 312. Otherwise, the process ends.

Figure 4:
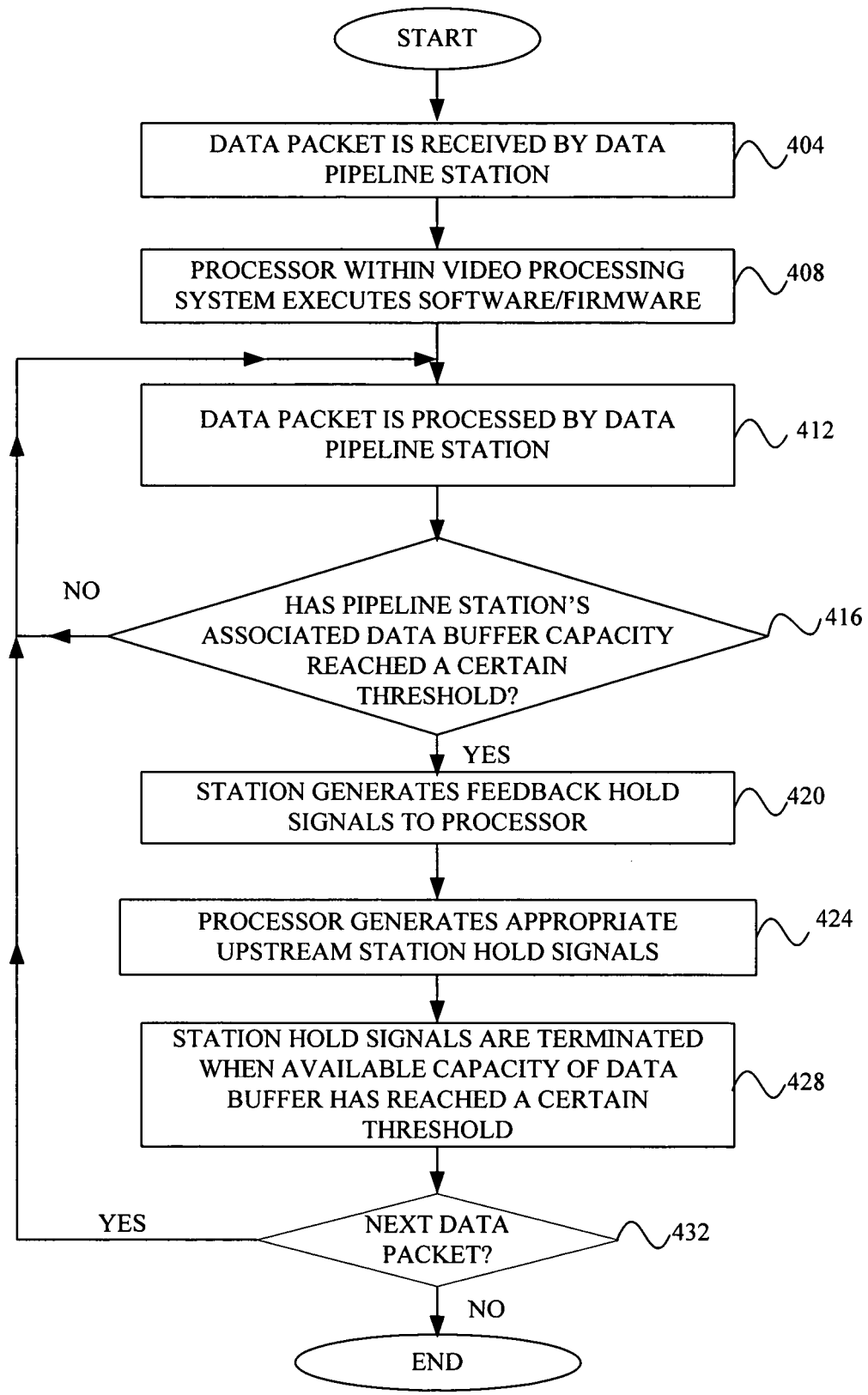
FIG. 4 is a second operational flow diagram illustrating an operation of a data flow control system in accordance with an embodiment of the invention.

FIG. 4 is a second operational flow diagram illustrating an operation of a data flow control system in accordance with an embodiment of the invention. The flow control system may be used to efficiently process data in a personal video recorder (PVR) or digital video recorder (DVR), for example. At step 404, a data pipeline station receives a data packet. Next, at step 408, a programmable processor of the data flow control system executes a software/firmware. Next, at step 412, the data packet is processed by the data pipeline station. At step 416, the programmable processor and/or data pipeline station determine if the data buffer associated with the data pipeline station has reached a certain capacity. The programmable processor may monitor and communicate with the one or more data pipeline stations of the data flow control system. The data pipeline station may monitor whether the available data buffer capacity has decreased below a first threshold (i.e., has reached a certain utilization level). If the available data buffer capacity has decreased below the first threshold, the process continues at step 420. At step 420, the data pipeline station generates a feedback hold signal to the programmable processor. Otherwise, the process reverts back to step 412. Thereafter, at step 424, in response to the feedback hold signal, the programmable processor generates one or more appropriate upstream station hold signals. The one or more station hold signals may be used to regulate transmission of data packets upstream from the data pipeline station, by way of inhibiting the transmission of additional data packets into the data pipeline station. At step 428, after the available data buffer capacity has increased above a second threshold, for example, the one or more station hold signals are terminated such that data transmission from upstream data pipeline stations may resume. Thereafter, at step 432, an assessment is made whether another data packet is available for processing at the data pipeline station. If another packet is waiting to be processed, the process reverts to step 412. Otherwise, the process ends.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method comprising:
   monitoring a processing time of a data packet using a processor, said data packet received at a processing station in a data pipeline;
   determining if the processing time exceeds a specified time;
   generating a feedback control signal from said processing station to said processor if said processing time is exceeded; and
   generating a hold signal from said processor to an upstream processing station, said hold signal generated in response to said feedback control signal, said hold signal used to inhibit data transmission at said upstream processing station, said data pipeline resident in a video processing system.

2. The method of claim 1 wherein said processing station processes an index table buffer (ITB) entry provided by said data packet.

3. The method of claim 1 further comprising terminating said feedback control signal when processing of said data packet is completed at said processing station.

4. The method of claim 1 wherein said hold signal is provided to a switching circuitry in said upstream processing station.

5. The method of claim 1 wherein said video processing system comprises a personal video recorder (PVR).

6. The method of claim 1 wherein said video processing system comprises a digital video recorder (DVR).

7. The method of claim 1 wherein said video processing system comprises a set-top box.

8. A method, comprising:
   monitoring available capacity of a data buffer using a processor, said data buffer located between two adjacent processing stations;
   determining if the available capacity of said data buffer has reached a first threshold;
   generating a feedback control signal to said processor if said first threshold is reached; and
   generating a hold signal from said processor to an upstream processing station, said hold signal generated in response to said feedback control signal, said hold signal used to inhibit data transmission at said upstream processing station, said processor, said data buffer, and said processing stations used for regulating data flow in a video processing system.

9. The method of claim 8 further comprising terminating said feedback control signal when the available capacity of said data buffer has increased to a second threshold.

10. The method of claim 8 wherein said hold signal is provided to a switching circuitry in said upstream processing station.

11. The method of claim 8 wherein said video processing system comprises a personal video recorder (PVR).

12. The method of claim 8 wherein said video processing system comprises a digital video recorder (DVR).

13. The method of claim 8 wherein said video processing system comprises a set-top box.

14. A system, comprising:
   a processor that executes a software/firmware;
   a data buffer;
   a processing station, comprising switching circuitry, the data buffer used to buffer a corresponding processing station; and
   wherein the software/firmware is configured to generate a signal for inhibiting transmission of data packets at the processing station by way of disabling data transmission using said switching circuitry, the signal being generated in response to a feedback control signal generated by the processing station, said processor, said data buffer, and said processing station being used to regulate data transmission in a data processing pipeline of a video processing system.

15. The system of claim 14 wherein said processor comprises a memory used for storing and executing said software/firmware.

16. The system of claim 14 wherein said processor comprises a central processing unit (CPU).

17. The system of claim 14 wherein said video processing system is used in a personal video recorder (PVR).

18. The system of claim 14 wherein said video processing system is used in a digital video recorder (DVR).

19. The system of claim 14 wherein said video processing system is used in a set-top box.

20. The system of claim 14 wherein the feedback control signal is generated when a processing time of the processing station exceeds a threshold.

21. The system of claim 14 wherein the feedback control signal is generated when an available capacity of said data buffer decreases below a threshold.

22. The method of claim 1 wherein said data transmission is inhibited in a specific frequency band of said upstream processing station.

23. The method of claim 8 wherein the data transmission is inhibited in a specific frequency band of the processing station.

24. The system of claim 14 wherein said data transmission is disabled in a specific frequency band of the processing station.

* * * * *